United States Patent [19]
Liu

[11] Patent Number: 5,251,192
[45] Date of Patent: Oct. 5, 1993

[54] CD PLAYER ACTUATION SYSTEM

[75] Inventor: Ping-Hsiung Liu, Tainan Hsien, Taiwan

[73] Assignee: Hanpin Electron Co., Ltd., Tainan Hsien, Taiwan

[21] Appl. No.: 784,917

[22] Filed: Oct. 30, 1991

[51] Int. Cl.⁵ .............................................. G11B 17/22
[52] U.S. Cl. ........................................ 369/36; 369/37
[58] Field of Search ................................... 369/36, 37

[56] References Cited

U.S. PATENT DOCUMENTS

| | | | |
|---|---|---|---|
| 4,755,978 | 7/1988 | Takizawa et al. | 369/37 |
| 5,115,419 | 5/1992 | Akiyama et al. | 369/37 |
| 5,173,889 | 12/1992 | Nagahisa et al. | 369/37 |

Primary Examiner—Edward P. Westin
Assistant Examiner—John R. Lee
Attorney, Agent, or Firm—Morton J. Rosenberg; David I. Klein

[57] ABSTRACT

A CD player comprising a CD cap swingable to open or close with the ability to turn on and off power by its closing and opening movement. A CD turning disc supporter is displaceable up and down for rotating a CD placed in one of the recesses formed in the turning plate or to lower the CD turning disc for swinging open the CD cap to change a CD turning disc to change a CD or to package the CD player for transportation by use of two projections and a roller provided at one side of the CD turning disc supporter interface with an inclined-faced wheel so that the disc supporter may be maintained in an immovable location.

5 Claims, 9 Drawing Sheets

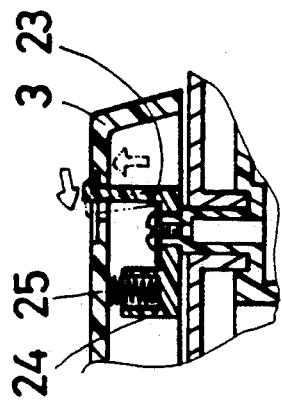
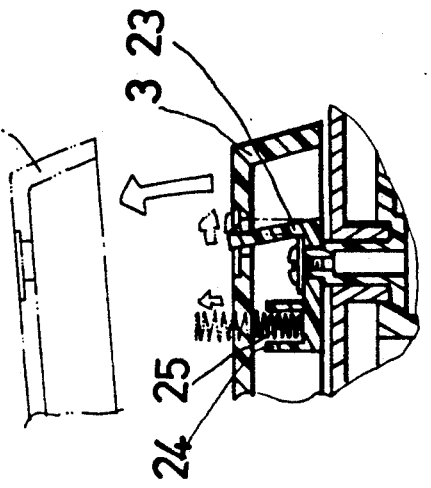
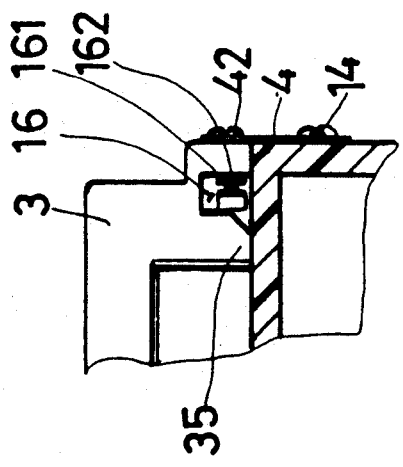
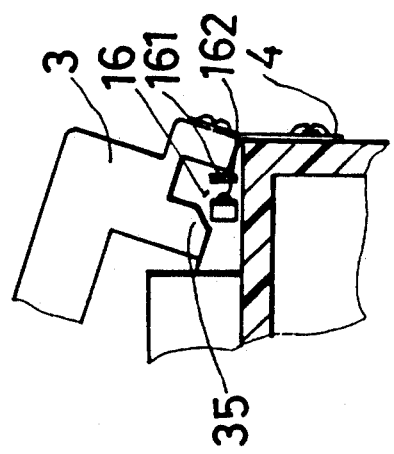

CD PLAYER ACTUATION SYSTEM

BACKGROUND OF THE INVENTION

Generally prior art CD players, as shown in FIGS. 11 and 12, include a CD cap 40 fixed firmly on the base 10 through threaded elements such as screws 101 passing upwardly from a bottom section. The CD cap 40 is used for stabilizing the movement of the CD, however, conventional or prior art CD players have a number of disadvantages provided in the following paragraphs.

1. The prior art cap is maintained in its position by means of screws so that a CD cannot be removed without the screws being removed in case the CD player stops owing to either a power failure or mechanical failure.

2. The prior art cap cannot be swung open posing an inconvenience to the user.

3. The prior art CD player shown in FIG. 12 is susceptible to having its components broken by carelessness or accidental shock during transportation before it is removed from its package. Due to the fact that the CD turning disc supporter 20 is maintained in an immovable state with not enough stabilization for transportation, a roller 201 is fixed on one side of the CD turning disc supporter 20 which pushes the lowest point on the surface of an inclined-faced wheel 60 to prevent the CD turning disc supporter 20 from moving. The disc supporter 20 is moved down from its highest position (playing position) to the lowest position by means of the roller 201 rolling along on the inclined screw groove 601 in the surface of the inclined-faced wheel 60 which is combined with and rotated by a transmission gear unit 50.

SUMMARY OF THE INVENTION

This invention has as an object to supply a CD player having a CD cap which is swingable up and down and functions as a switch for actuating power, a laser source, as well as positioning the CD in a stable state without swaying or rotation.

Another object of this invention is to supply a CD player which has a CD turning disc supporter provided with three touch points to contact with an inclined-faced wheel when the disc supporter is moved down to a lowermost position so that the CD player may be packaged in a manner to keep the turning disc supporter in a stable and secure positional location for transportation.

Another object is to supply a CD player having the CD turning disc supporter held between two support walls fixed on the base so that rising and descending displacement of the supporter may be maintained in a secure and stable manner.

Another object is to supply a CD player where a CD placed on a turning plate for playing can be sustained stably by the CD turning disc moving up and down with the CD turning disc supporter, which receives an elasticity from an elastic tightening member combined with the disc supporter.

BRIEF DESCRIPTION OF THE DRAWINGS

FIG. 4 is a positional side view of a touch rod 35 when the CD cap is swung open in the CD player in the present invention;

FIG. 5 is a cross-sectional view of the CD cap and the position plate with the cap being opened on the CD player of the present invention;

FIG. 6 is a cross-sectional view of the touch rod 35 when the CD cap is swung down on the CD player;

FIG. 7 is a cross-sectional view of the upright rod 24 of the turning plate hooked to the CD cap in the CD player;

FIG. 11-1 is a cross-sectional view of a portion of the CD player of FIG. 11 taken along the section lines 11-1 of FIG. 11; and, FIG. 12 is a side cross-sectional view of a prior art CD player.

DETAILED DESCRIPTION OF THE INVENTION

Figure 1:
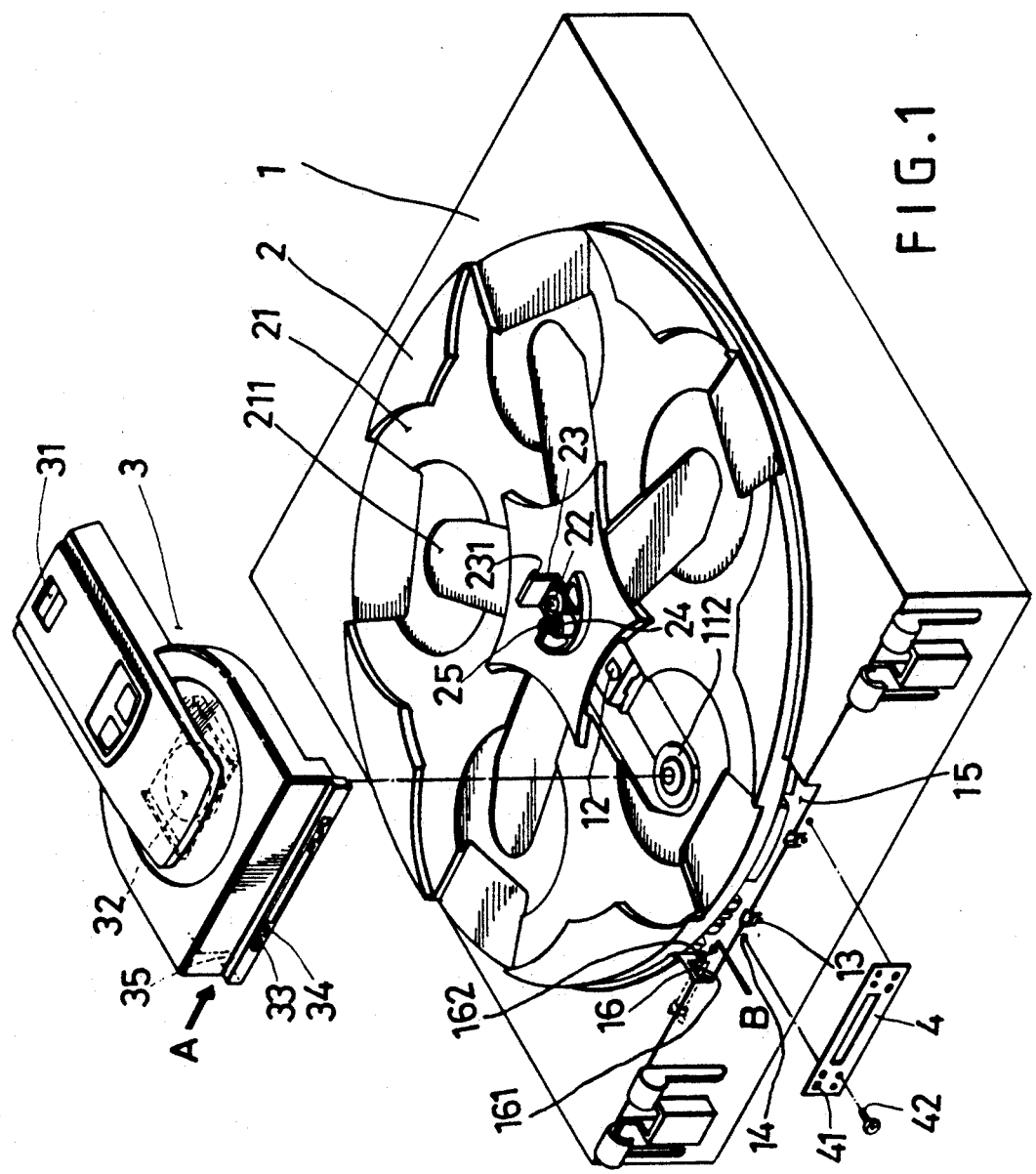
FIG. 1 is a perspective view of a CD player in accordance with the present invention concept.
Figure 2:
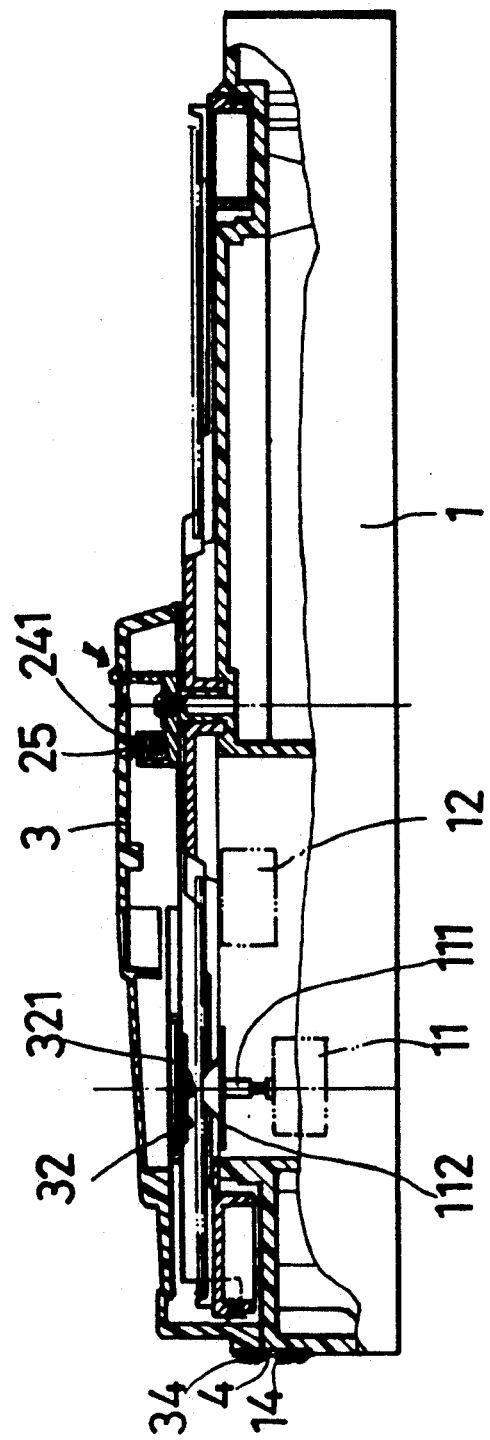
FIG. 2 is a side cross-sectional view of the CD player in accordance with the present invention concept.
Figure 3:
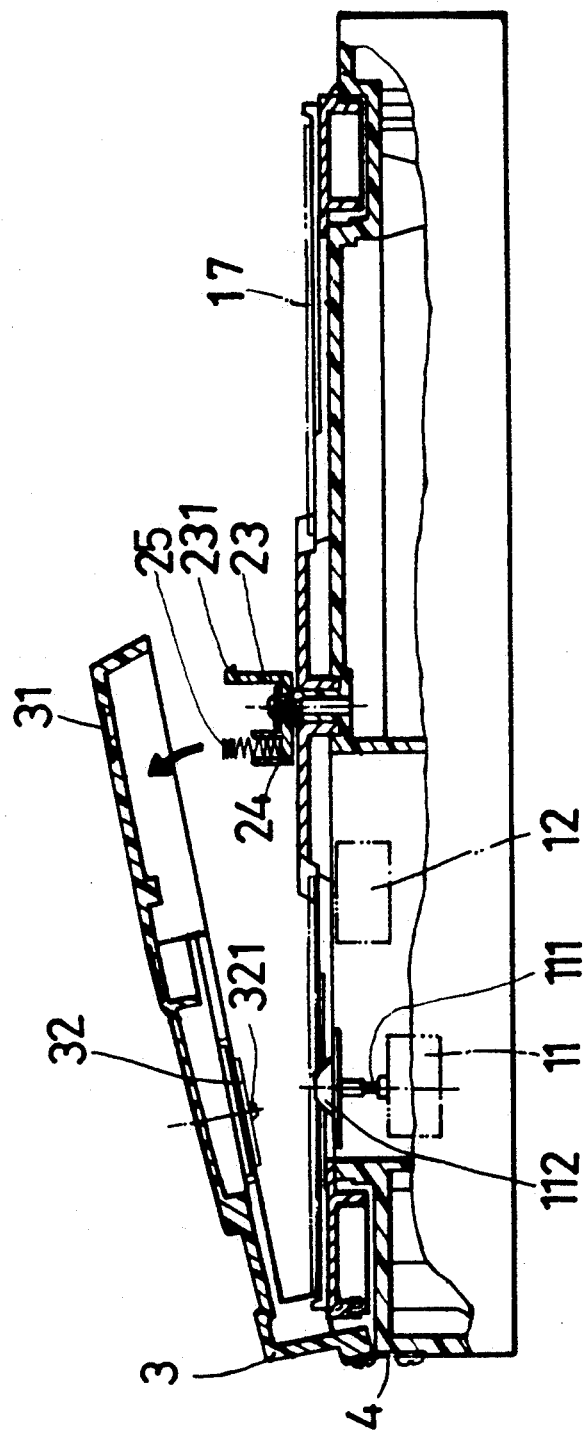
FIG. 3 is a side cross-sectional view of the CD cap opened in the CD player of the present invention.

A CD player in accordance with the present invention is shown in FIGS. 1 and 2, and includes a base 1, a turning plate 2, a CD cap 3, a connecting plate 4, a CD turning disc supporter 5, an inclined-faced wheel 6, a support base 7, and an elastic tightening member 9 as its main components.

The base 1 contains a motor 11 for rotating a CD and a laser source 12. The motor 11 has a shaft 111, the top end of which is fixed with a CD turning disc 112. One side wall of the base 1 is provided at its top edge with spaced apart threaded holes 13. Projecting posts 14 are also spaced apart and a recess 15 is formed in the base 1. A switch 16 consisting of a projection 161 and a spring 162 is provided at one end of the recess 15.

The turning plate 2 on the base is provided for placement of a plurality of compact discs for continuous playing. The turning plate 2 has a plurality of recesses 21 equally spaced around in its upper surface for placing the same number of compact discs. The turning plate 2 has a hole bored in each recess 21, and a position plate 23 centrally fixed by means of a screw 22. There is further included the upright hook 231, an upright post 24 having a hollow cavity, and a spring 25 located in the central hollow cavity.

The CD cap 3 has a combined rounded portion and a rectangular section extending forward the round portion. An opening 31 is formed in the outer end of the rectangular section and a cover disc 32 is provided below and shielded by the rounded portion. A central projection 321 projects downwardly from the center of the cover disc 32. Holes 33 and projection posts 34 at the right side wall bottom correspond to the projecting posts 14 and the threaded holes 13 in the base 2, and a touch rod 35 projects from the inside bottom of the right side wall.

The connecting plate 4 is rectangularly shaped, having a plurality of holes 41 within both sides for screws 42 to pass through to screw in the wall of the base 1 for coupling the connecting plate 4 to the base 1. The projecting posts 34 of the CD cap 3 pass through the holes 41 from the inside and the projecting posts 14 of the base 1 extending similarly.

In assembling the components 1, 2, 3 and 4, the motor 11 and the laser source 12 are first to be combined with the base 1 within its interior. The turning plate 2 is then mounted on the base 1 from the upper side and subsequently the position plate 23 is fixed firmly on the center of the turning-plate 2. The turning plate 2 is rotated freely by a motor on the base 1. Next, the CD cap is mounted on the turning plate 2 from the upper side, with its left straight side bottom fitted within the recess 15 in the base 1. The connecting plate 4 is positioned in a manner that the holes 41 are aligned with the projecting posts 14 and 34 of the base 1 and the CD cap 3. After that, the screws 42 are inserted through the holes 41 to assemble the CD cap 3 and the base 1 into a combined structure.

FIG. 4 shows that when the CD cap is swung open after assemblage, the touch rod 35 is separated from the switch 16, which then turns off the power. FIG. 5 shows the touch rod 35 pressing the spring 162 of the switch 16, which then turns on the power. When the CD cap is swung or closed down with its opening 31 inserted through upward and hooked by the hook 231 of the position plate 23, the power is turned on.

In using this CD player, the recesses 21 in the turning plate 2 can receive the same number of CDs 11 and then the CD cap 3 may be closed down on the CD placed in one of the recesses 21. The CD is rotated by the CD turning disc 112 combined with the motor 11 which is raised together with the CD turning disc supporter 5 to the highest position so that the CD is pinched between the CD turning disc 112 and the central projection 321 of the cover disc 32. Then the power is turned on by the switch 16 to rotate the CD turning disc 112 and to start the laser source 13.

If the power is suddenly cut off or mechanical failure occurs to the CD player while in motion, a user can push the hook 231 to separate it from the opening 31, letting the CD cap open by means of the elasticity of the spring 25 in the upright post 24 so as to enable the CD 11 to be removed from the turning plate 2.

Figure 8:
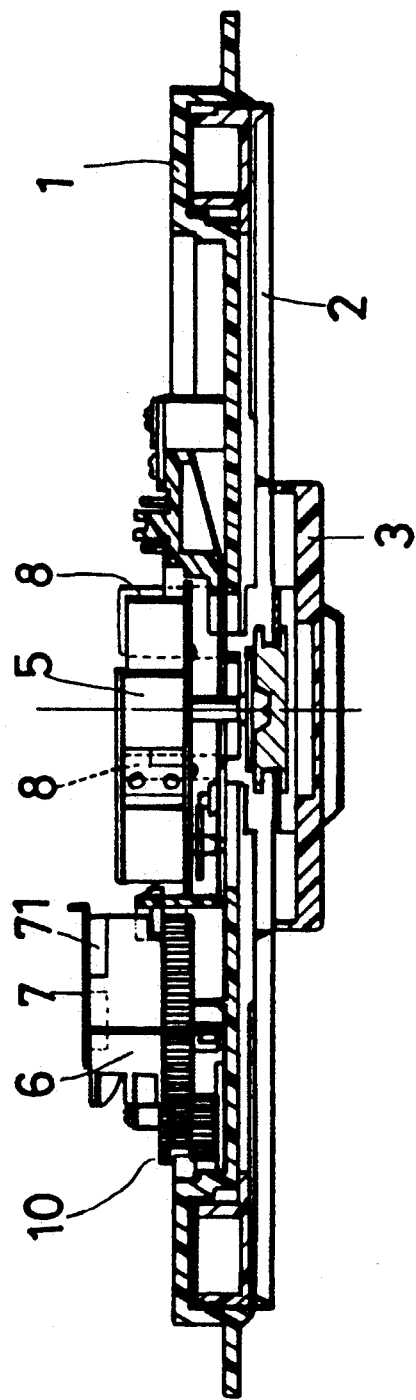
FIG. 8 is a side cross-sectional reversed view of a CD mounted on the turning plate to be played in the CD player.
Figure 9:
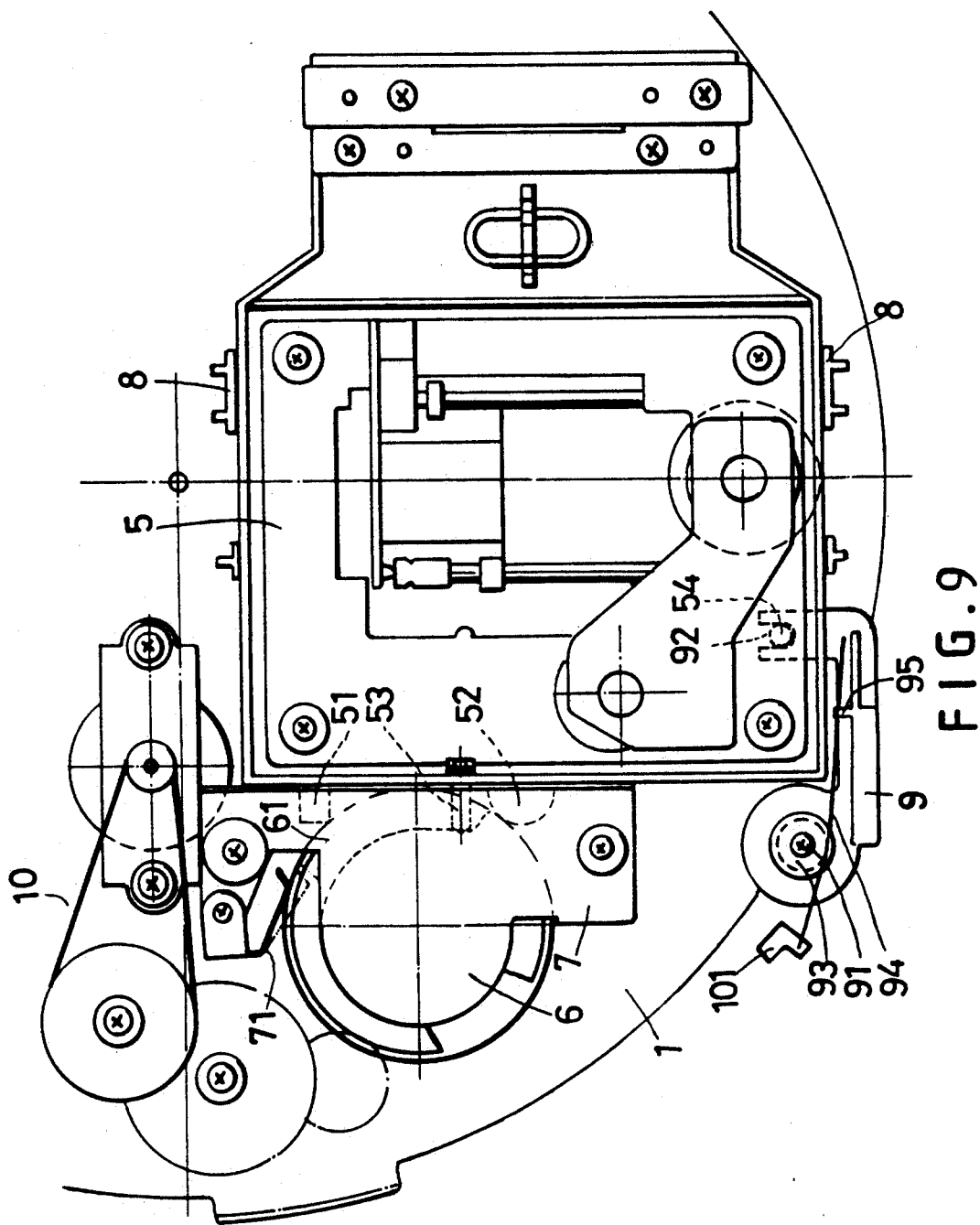
FIG. 9 is a bottom view of the base of the CD player.
Figure 10:
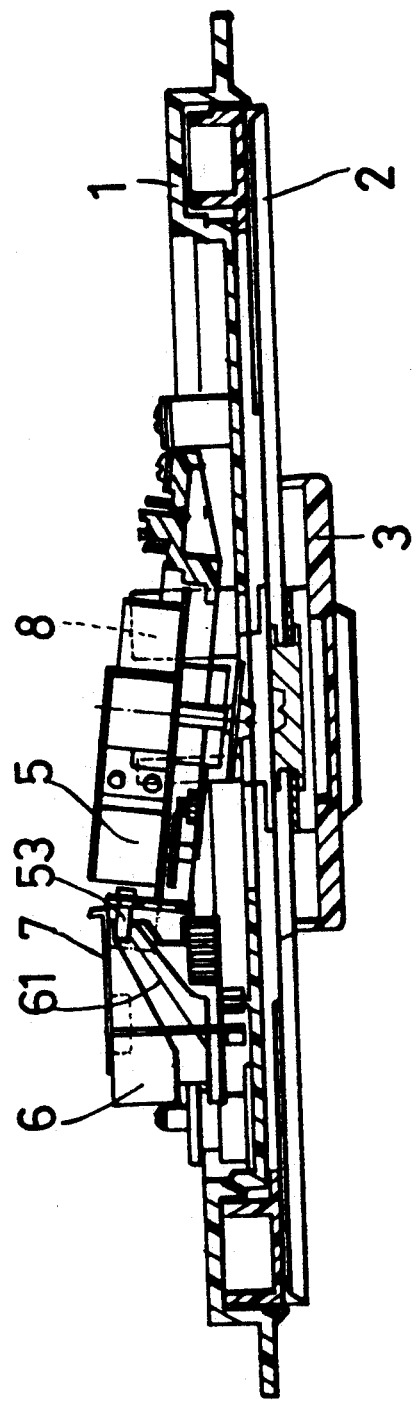
FIG. 10 is a side cross-sectional view of the CD player with the CD turning disc supporter lowered to a lowermost position for packaging for transportation.
Figures 1, 11:
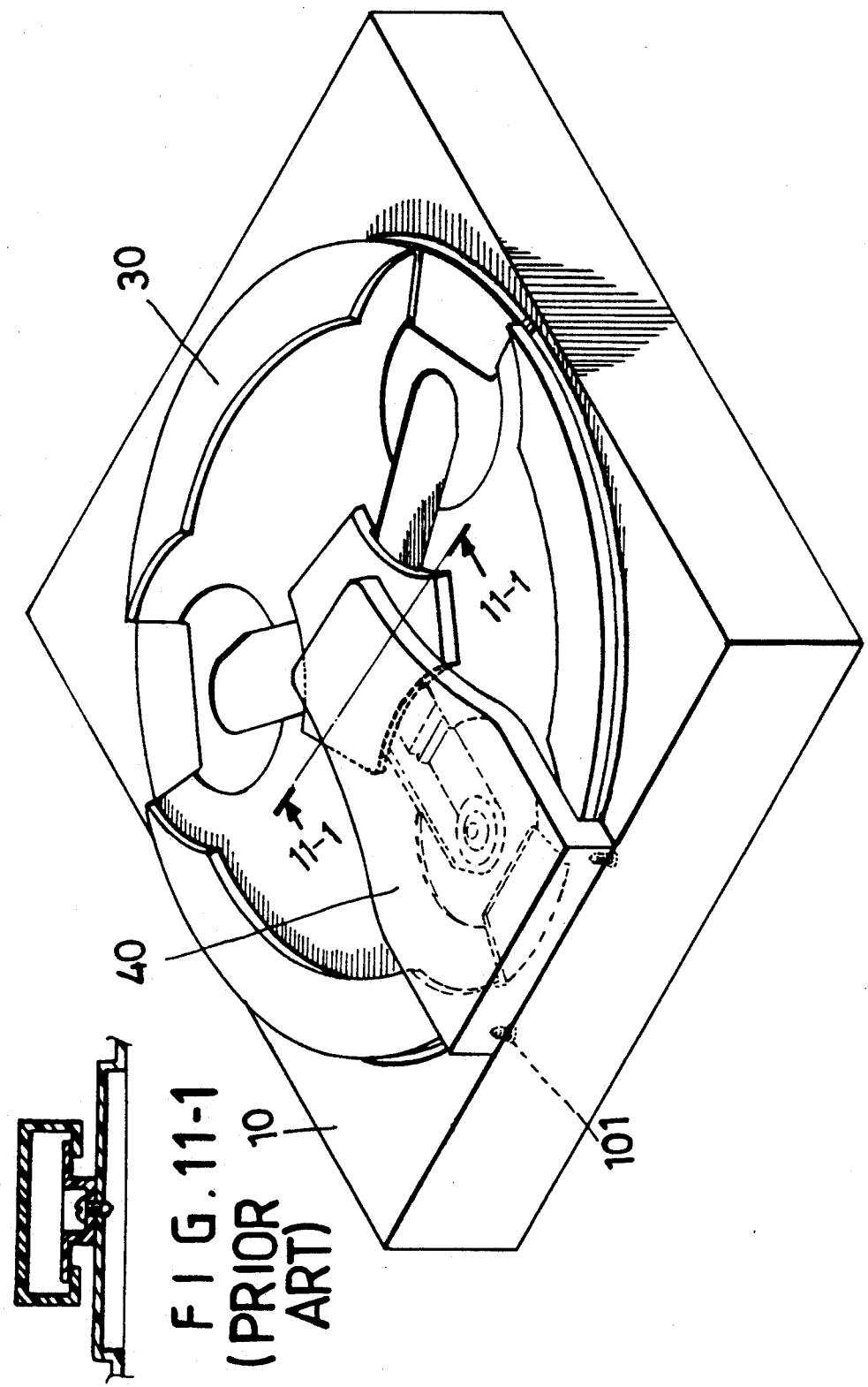
FIG. 11 is a perspective view of a prior art CD player.
Figure 12:
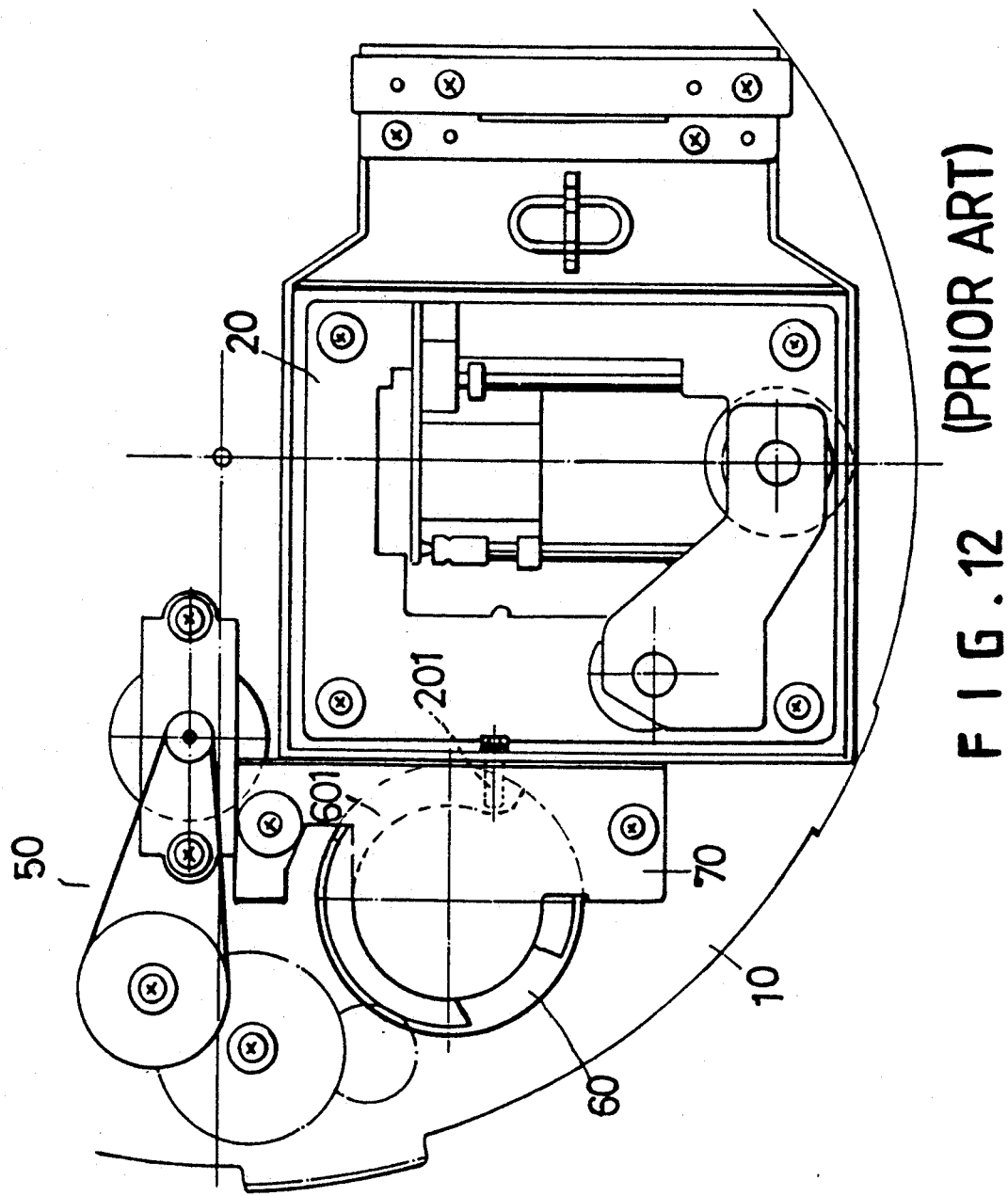

The CD turning disc supporter 5 is provided below the central portion of the base 1 having its left end (the free end) movable downwardly with the right end fixed on the base 1 as a pivot, responsively moves two projections 51, 52 projecting from the left side edge so that the two projections 51, 52 together with a roller 53 which is also fixed at the left side edge can touch an inclined-faced wheel 6 to keep the CD turning disc supporter 5 in a stable and secure condition when the CD turning disc supporter 5 is moved down to the lowest position, as shown in FIG. 10. The inclined-faced wheel 6 is positioned on a support base 7, which has an elastic check piece 71 to elastically push and maintain stationary the round edge of the inclined-faced wheel 6 when the wheel 6 is rotated to make the CD turning disc supporter 5 move downwardly to the lowest position shown in FIG. 10 guided by the roller 53 rolling along the inclined face of the wheel 6. The CD turning disc supporter 5 is also held between two support posts 8 provided respectively at opposite sides near the right side of the CD turning disc supporter 5. The inclined-faced wheel 6 can be rotated by a transmission gear unit 10 provided under the base 1, having a screw groove 61 to interface with the cylindrical roller 53 so that the CD turning disc supporter 5 can be raised up to the highest position shown in FIG. 8, 9 from the lowest position shown in FIG. 10. When the CD turning disc supporter 5 is at the lowest position, the CD has completed operation and may be changed or packaged for transportation. Therefore, provision of the projections 51, 52, the roller 53 and the upright posts 8 can assist the CD turning disc supporter 5 to move up and down more smoothly and steadily between the lowest position and the highest position without any unsecure vibration or swaying.

The elastic tightening member 9 is provided at the left side corner of the CD turning disc supporter 5 below the base 1 means of a screw 91 structurely securing it to the base 1. Member 9 has a notch 92 formed in its bent right end for an upright rod 54 on the CD turning disc supporter 5 to fit therein. A projection 93 is further provided at the left end for an elastic plate spring 94 to rest. The elastic plate spring 94 has its left end inserted in a hole 101 in the base 1 and its right end rests on a sidewise post 95 of the elastic tightening member 9 to keep the supporter 5 in its position with enhanced elasticity.

This CD player is considered to have the following advantages.

1. The CD cap in this CD player may be swung open or shut, turning on and off the power and the laser source simultaneously with closing and opening so as to prevent the laser beam from being emitted externally to hurt user's eyes.

2. The CD cap can be swung open for taking out the CD placed in for playing without any tool in the event the power is suddenly or accidentally cut off or there is a mechanical failure.

3. The rotation of a CD can be very stable and steady, by means of the cover disc 32 and the CD turning disc 112 pinching one of the CDs to be played.

4. The CD cap can be kept tightly closed by means of the hook 231 of the position plate 23, which can completely stop the laser beam from being emitted externally.

5. The CD turning disc supporter 5 can have a larger contact dimension with the inclined-faced wheel 6 by means of the three contact members-two projections 51, 52, and the projecting roller 53 than a conventional CD player, when the CD turning disc supporter 5 moves down to the lowest position by the rotation of the inclined-faced wheel 6. Therefore, the CD turning disc supporter 5 can be kept secure and immovable at the lowest position for packaging or transportation, without possible collision with other components possibly caused by shocks in the transporting process.

6. The CD turning disc supporter 5 can be moved up and down by the inclined-faced wheel 6 being rotated by the transmission gear unit 10, and its movement is steady and secure by guidance of the two support walls 8 provided on the base 1.

7. The elastic tightening member 9 combined at the bottom of the base 1 can securely and elastically assist to keep the CD turning disc supporter 5 in its highest position so as to keep the CD 11 being played in very stable condition with the upright post 54 inserted in the notch 92 on the CD turning disc supporter 5.

What is claimed is:

1. A CD player actuation system comprising:
a motor for rotating a CD turning disc;
a laser source to generate a laser beam;

a base containing the motor and the laser source, having a recess formed within a rear side top section, a switch consisting of two springs provided at one end of the recess, one of the two springs having an end provided with projection, a plurality of projecting posts spaced apart on the wall below the recess, and several threaded holes spaced apart on the wall below the recess;

a turning plate having a plurality of CD recesses spaced around on an upper surface thereof for CDs to be placed thereon, a position plate located centrally, said position plate provided with an upright hook to be inserted upward through an opening in a CD cap to hook the CD cap securely when the CD cap is closed on a CD placed in one of the CD recesses of the turning plate;

said CD cap having a round portion for a cover disc to be movably coupled under the cap and a rectangular portion with a bent-down end wall extending forward from the round portion, said rectangular portion having an opening for positioning the hook of the position plate of the turning plate for upward insertion therethrough to hook the CD cap when it is closed, the bent down end wall having a plurality of projecting posts and a plurality of threaded holes spaced apart so as to couple the CD cap with the base by means of a connecting plate having holes to fit with the projecting posts of the base and the CD cap and aligned with the holes of the base and the CD cap for screws to pass therethrough, said cover disc having a downwardly directed central projection at its center; and a rectangularly contoured connecting plate having a plurality of holes for insertion of said projecting posts of the base and the CD cap to pass through and for screws to pass through to screw with the threaded holes of the base and the CD cap to couple the CD cap with the base so that the CD cap can be swung up and down at a free end with one end as a pivot to maintain the CD stable when placed on one of the CD recesses in the turning plate and to further actuate power to the CD.

2. The CD player actuation system as claimed in claim 1, including an upright post having a hollow cavity mounted on the upper surface of the turning plate, and a spring provided to sit upright in the cavity so as to bias upwardly the CD cap when said CD cap is closed and compressing said spring.

3. The CD player actuation system as claimed in claim 1, including a CD turning disc supporter located under the base having a first end threaded to the base and a second end reversably swingable and having two projections and a roller mounted on the second end for contacting with an inclined-faced wheel when the CD turning disc supporter moves down to a lowermost position guided by the roller rolling on the inclined face of the wheel, said wheel rotatably fixed on a support base which has an elastic check piece member at one end to press the CD turning disc supporter securely when the CD turning disc supporter has been moved down to the lowermost position, and the base further having two vertical support walls.

4. The CD player actuation system as claimed in claim 3, wherein the roller provided on the second end of the CD turning disc supporter is fixed on a projecting rod.

5. The CD player actuation system as claimed in claim 3, wherein an elastic tightening member is provided to assist in positioning the CD turning disc supporter securely, having one end screwed to the base and the other end provided with a notch for insertion of an upright post on the CD turning disc supporter, and wherein a projection is formed on one end of said tightening member for an elastic plate spring to be located, said elastic plate spring having one end inserted in a hole in the base and the other end resting on a post of the elastic tightening member when the CD turning disc supporter has been raised to the highest position for playing the CD.

* * * * *